US008744077B2

(12) United States Patent
Camenisch et al.

(10) Patent No.: US 8,744,077 B2
(45) Date of Patent: Jun. 3, 2014

(54) CRYPTOGRAPHIC ENCODING AND DECODING OF SECRET DATA

(75) Inventors: Jan Leonhard Camenisch, Thalwil (CH); Thomas R. Gross, Zurich (CH); Thomas Scott Heydt-Benjamin, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 12/606,710

(22) Filed: Oct. 27, 2009

(65) Prior Publication Data

US 2010/0142704 A1 Jun. 10, 2010

(30) Foreign Application Priority Data

Oct. 28, 2008 (EP) .................................... 08105681

(51) Int. Cl.
*H04L 9/00* (2006.01)
(52) U.S. Cl.
USPC ............................................ 380/44; 713/150
(58) Field of Classification Search
USPC ........................................................ 380/44
See application file for complete search history.

(56) References Cited

U.S. PATENT DOCUMENTS

| | | | | |
|---|---|---|---|---|
| 7,596,530 | B1 * | 9/2009 | Glasberg | 705/64 |
| 2005/0071657 | A1 * | 3/2005 | Ryan | 713/193 |
| 2007/0061569 | A1 * | 3/2007 | Lee et al. | 713/163 |
| 2007/0234046 | A1 * | 10/2007 | Ishiyama | 713/158 |
| 2008/0044027 | A1 * | 2/2008 | Van Dijk | 380/278 |

OTHER PUBLICATIONS

R. L. Rivest et. al., "A method for obtaining Digital Signatures and public-key Cryptosystems", Communications of the ACM, Feb. 1978, 21(2), pp. 120-126.
E. Fujisaki et. al., "Statistical zero knowledge protocols to prove modular polynomial relations", Lecture Notes in Computer Science, 1997, vol. 1294, pp. 16-30.
T. P. Pedersen et. al., "Non-interactive and Information-theoretic Secure Verifiable Secret Sharing", Lecture Notes in Computer Science, 1992, vol. 576, pp. 129-140.
I. Damgard et. al., "An integer commitment scheme based on groups with hidden order", ASIACRYPT, 2002, vol. 2501.
J. Camenisch et. al., "Efficient Group Signature Schemes for Large Groups", Lecture Notes in Computer Science, 1997, vol. 1294, pp. 410-424.
A. Fiat et. al., "How to prove yourself: Practical solutions to identification and signature problems", Lecture Notes in Computer Science, 1987, vol. 263, pp. 186-194.
J. Camenisch et. al., "A Signature Scheme with Efficient Protocols", Lecture Notes in Computer Science, 2003, vol. 2576, pp. 268-289.

(Continued)

*Primary Examiner* — Brandon Hoffman
*Assistant Examiner* — Anthony Brown
(74) *Attorney, Agent, or Firm* — Harrington & Smith (57) ABSTRACT

Methods and apparatus are provided for cryptographically encoding secret data in a data processing system. The secret data is encoded in accordance with a verifiable encryption process to produce a cryptographic construction (θ) having a decryption constraint dependent on the occurrence of a predetermined event. An event-dependent decryption constraint is thereby built into the cryptography, so that there is an intrinsic restriction on the ability to decrypt the encoded secret data which is dependent on occurrence of the predetermined event. Decoding apparatus for such a cryptographic construction is also provided, as well as distributed trust data processing systems providing accountable privacy based on use of such cryptographic constructions.

19 Claims, 3 Drawing Sheets

(56) References Cited

OTHER PUBLICATIONS

Abdalla et. al., "Searchable encryption revisited: Consistency properties, relation to anonymous ibe, ana extensions", Lecture Notes in Computer Science, 2005, vol. 3621.

Green et. al., "Blind identity-based encryption and simulatable oblivious transfer", ASIACRYPT, 2007, pp. 265-282.

J. Camenisch et. al., "Public key encryption with oblivious keyword search and its application to data retention", IBM Research Report RZ 3708, IBM Research, May 2008.

J. Camemsch et. al., "Practical verifiable encryption and decryption of discrete logarithms", Lecture Notes in Computer Science, 2003, vol. 2729 pp. 126-144.

* cited by examiner

CRYPTOGRAPHIC ENCODING AND DECODING OF SECRET DATA

CROSS-REFERENCE TO RELATED APPLICATION

This application claims priority under 35 U.S.C. §119 from European Patent Application No. 08105681.4 filed Oct. 28, 2008, the entire contents of which are incorporated herein by reference.

BACKGROUND OF THE INVENTION

1. Field of the Invention

This invention relates generally to cryptographic encoding and decoding of secret data in data processing systems. More particularly, the present invention relates to systems, methods and apparatus for verifiably encrypting data in order to prevent the decryption of the data until the occurrence of a predetermined event.

2. Description of Related Art

Cryptographic encoding is used in a variety of security and privacy-sensitive applications where one party (hereinafter "user") needs to send private data securely to another party (hereinafter "verifier") in a potentially insecure data processing system, for example over an insecure network such as the Internet. Some applications necessarily involve the verifier decoding the private data. In other applications, it is desirable to keep the private data secret from the verifier, unless circumstances arise which necessitate disclosure of the private user information. A common example of the latter scenario is making an on-line purchase where users connect to a remote server via a data communications network to access some service or other resource. The privacy concerns of users and regulatory privacy requirements often demand that users have anonymity in such circumstances, i.e. that the identity of users is not revealed to the service provider. However, to protect the interests of the service provider, there should be a way for the service provider to obtain the identity of misbehaving users, e.g. users who do not pay their bills. This situation therefore demands for privacy protection coupled with user accountability.

In these situations where secret user data should be revealed to a verifier only in certain circumstances, current systems rely on the user sending the verifier a cryptographic construction which encodes the secret data, and which can be decoded if necessary using a cryptographic key held by a trusted third party. For example, the cryptographic construction can be a credential generated using a cryptographic process by a trusted issuing party who has in some manner verified the information for which the credential is issued. The secret data should be encoded in the cryptographic construction using a "verifiable encryption process", where this term refers generally herein to encryption processes employing cryptographic protocols which allow proofs to be made about the properties of encrypted data (often defined in terms of "attributes") without revealing the data itself (the "attribute values"). In simple terms, if secret data X is encoded using a verifiable encryption process, then it can be cryptographically proven that the encrypted data contains the data X without actually revealing X. For example, if X is a user ID certified by a government agency, then it can be proven that the encrypted data contains a government-certified ID without revealing the ID itself. In the present scenario therefore, the verifier can cryptographically verify that the received construction contains the required secret data without the secret data itself being revealed. If valid circumstances arise for decrypting the secret data, the verifier can apply to the trusted third party, for example the police or other government agency, to obtain a decryption of the secret data. These systems require a high-level of trust to be invested in the key-holding party by both user and verifier. The need to involve such a highly-trusted authority can also be problematical in practice. For example, bringing a case before a law enforcement agency can be expensive and time consuming. Such systems can also be vulnerable to abuse by malicious verifiers who attempt to obtain unwarranted release of decryption keys.

SUMMARY OF THE INVENTION

According to an aspect of the present invention, a method for cryptographically encoding secret data in a data processing system is provided. The method includes the step of encoding the secret data in accordance with a verifiable encryption process to produce a cryptographic construction ($\theta$) having a decryption constraint dependent on the occurrence of a predetermined event.

According to another aspect of the present invention, a computer readable article of manufacture tangibly embodying computer readable instructions is provided for causing a data processing system to execute the steps of the above method.

According to another aspect of the present invention, an encoding apparatus for cryptographically encoding secret data is provided. The encoding apparatus includes control logic adapted to encode the secret data in accordance with a verifiable encryption process to produce a cryptographic construction ($\theta$) having a decryption constraint dependent on the occurrence of a predetermined event.

According to another aspect of the present invention, a decoding apparatus for receiving a cryptographic construction ($\theta$) is provided. The decoding apparatus includes memory for storing the cryptographic construction and control logic adapted to (i) verify that the cryptographic construction contains secret data, (ii) determine the existence of a predetermined decoding condition which is dependent on the occurrence of at least one event including a predetermined first event, and (iii) decode the cryptographic construction as permitted by a decryption constraint if the at least one event occurred where the secret data is encoded in accordance with a verifiable encryption process such that the cryptographic construction has the decryption constraint which is dependent on the occurrence of the predetermined first event.

According to another aspect of the present invention, a distributed trust data processing system for cryptographically encoding and decoding data is provided. The distributed trust data processing system includes a user computer, wherein the user computer is adapted to (i) generate a public key of a public-private keypair which is dependent on an event indicator ($t_\omega$) indicative of a predetermined first event such that extraction of a private key ($sk_\theta$) of the keypair is also dependent on occurrence of the event indicated by the event indicator ($t_\omega$), (ii) use the public key to encode secret data in accordance with a verifiable encryption process which produces a cryptographic construction ($\theta$) having a decryption constraint dependent on the occurrence of the predetermined first event, and (iii) send the cryptographic construction ($\theta$) to the verifier computer via a data communications network; a key-extraction computer, wherein the key-extraction computer is adapted to respond to the request from the verifier computer by (i) determining if a predetermined decoding condition, dependent on occurrence of at least one event including the predetermined first event, exists (ii) extracting the private key (sk$_\theta$) of the keypair and sending the private key (sk$_\theta$) to the verifier computer if the predetermined decoding condition exists; and a verifier computer, wherein the verifier computer is adapted to (i) verify that the cryptographic construction (θ) contains the secret data, (ii) store the cryptographic construction (θ) in memory (10), (iii) communicate with the key extraction computer via the data communications network to request the private key (sk$_\theta$) for the cryptographic construction (θ), and (iv) decode the cryptographic construction on receipt of the private key (sk$_\theta$); where the user, verifier, and key-extraction computers are adapted for communication via the data communications network.

DETAILED DESCRIPTION OF THE PREFERRED EMBODIMENTS

With encoding methods embodying this invention, the verifiable encryption process used to encode the secret data is such that an event-dependent decryption constraint is built into the cryptography. That is, there is an intrinsic restriction on the ability to decrypt the encoded secret data, this restriction being dependent on the occurrence of a predetermined event. This event can be related to the circumstance under which it is deemed permissible to reveal the secret user data, allowing user accountability to be provided without relying wholly on a fully-trusted third party who has full power to decrypt the data. This technique thus offers stronger user privacy while reducing the investment of trust required for implementing user accountability. In particular, the event-dependent decryption constraint provides the basis for secure, efficient, and flexible distributed-trust data processing systems which provide accountability, as exemplified by preferred embodiments described below.

As discussed earlier, the use of a verifiable encryption process means that a verifier can cryptographically verify that the cryptographic construction contains secret data with the required property or properties without the data itself being revealed to the verifier. If the secret data is a user ID for example, it can be cryptographically proven that the construction contains a valid user ID without disclosing the ID itself. The verifiable encryption process can of course involve encoding other elements as well as the secret data, so that the resulting cryptographic construction can comprise the encoded secret data and other encoded components. While alternatives can be envisaged, in preferred embodiments the verifiable encryption process is based on a system introduced by Camenisch and Shoup. Briefly, this allows the user to prove that the required secret data is encoded in the cryptographic construction, and that the construction can be decoded if required, via a zero-knowledge proof, i.e. a proof which does not reveal any other information than that which is to be proved. For instance, a user can use this system to encrypt her true identity to the authorities, provide this encrypted data to a verifier, and then convince the verifier in a zero-knowledge proof of knowledge that this encrypted data contains a valid user identity that can be opened by the authorities.

In general, the decryption constraint on the cryptographic construction can comprise a single constraint term, e.g. that decryption is impossible before some event E has occurred or a plurality of component constraint terms, e.g. that decryption is impossible before event E1 and decryption is impossible after event E2. Thus, the decryption constraint can in general depend on one or a plurality of predetermined events. Various types of event can be envisaged here depending on the particular application. For example, an event can be a time event, where "time" here can be real clock time or measured in terms of any other ordered sequence of events such as the number of times that some particular action, e.g. a system access occurs, or the issue of some numbered item such as a periodical magazine. Other types of events can include the satisfaction of some condition or the completion of some task, for instance payment of a bill, or the acquisition or issuance of some item such as a certificate proving a particular fact or occurrence.

Those skilled in the art will appreciate that there are a variety of ways in which a cryptographic construction can be constructed so as to implement the decryption constraint. In the preferred embodiments to be described, this is achieved by generating the public key of a public-private keypair which is dependent on an event indicator indicative of the predetermined event such that extraction of the private key of the keypair is dependent on occurrence of the event indicated by the event indicator. The secret data is then encoded using this public key, whereby the resulting construction can only be decoded when the event-dependent key-extraction is possible. For example, extraction of the private key can require an input dependent on occurrence of the event indicated by the event indicator, e.g. some cryptographic symbol which is trusted evidence of occurrence of the event. A particular example of this will be described below.

In a typical application the cryptographic construction, once generated, will be transmitted via a data communications channel to a receiving device of the data processing system where it will be subject to cryptographic verification and possible future decoding.

A predetermined decoding condition can be dependent only on the occurrence of the predetermined first event. For example the condition can be that an event has occurred. In general, however, the condition can be dependent on one or more further events and can be dependent in numerous ways on the occurrence of the different events as desired for a given application.

Where the secret data is encoded in the cryptographic construction using a public key of a public-private keypair dependent on an event indicator as described above, the control logic of the decoding apparatus preferably comprises: verifier logic for verifying that the cryptographic construction contains the secret data; and key extraction logic for extracting the private key of the keypair if the predetermined decoding condition exists. The verifier logic and key extraction logic can be under independent control here, thus further reducing the level of trust required of different components of the system. This provides the basis for highly flexible and efficient distributed trust data processing systems.

With the functionality divided between the verifier computer and an independent key extraction computer, the private key can be unlinkable to a specific user at the key extraction computer, preventing infringement of any specific user's privacy by a key extraction authority. In such systems, trust is distributed between at least the verifier and key extraction computers, so that neither one need be trusted to the same degree as if the functionality of the two were combined. Indeed, particularly preferred embodiments can distribute trust among additional independent entities to provide, if desired, full end-to-end unlinkability.

It will be understood that the term "computer" is used herein in the most general sense and includes any device, component or system having a data processing capability for implementing a computer program. Moreover, a computer program embodying the invention can constitute an independent program or can be an element of a larger program, and can be supplied, for example, embodied in a computer-readable medium such as a disk or an electronic transmission for loading in a computer. The program code means of the computer program can comprise any expression, in any language, code or notation, of a set of instructions intended to cause a computer to perform the method in question, either directly or after either or both of (a) conversion to another language, code or notation, and (b) reproduction in a different material form.

In general, where features are described herein with reference to an embodiment of one aspect of the invention, corresponding features can be provided in embodiments of another aspect of the invention as appropriate.

An embodiment of the present invention provides a verifier computer of a distributed trust data processing system. Another embodiment of the present invention provides a key extraction computer of a distributed trust data processing system.

Preferred embodiments of the invention will now be described, by way of example, with reference to the accompanying drawings.

Before describing data processing systems embodying the invention, we first present various cryptographic building blocks which are employed in operation of the exemplary embodiments to be described.

Assumptions

Strong RSA Assumption (See "A method for obtaining Digital Signatures and public-key Cryptosystems", R. L. Rivest, A. Shamir, L. Adleman, Communications of the ACM, 21(2):120-126. February 1978, and "Statistical zero knowledge protocols to prove modular polynomial relations", E. Fujisaki and T. Okamoto, in B. Kaliski, editor, Advances in Cryptology—CRYPTO '97, volume 1294 of Lecture Notes in Computer Science, pages 16-30, Springer Verlag, 1997): given an RSA modulus n and a random element $g \in Z^*_n$, it is hard to compute $h \in Z^*_n$ and integer $e>1$ such that $h^e \equiv g$ mod n. The modulus n is of a special form pq, where $p=2p'+1$ and $q=2q'+1$ are safe primes.

Integer Commitments

We recall the Pederson commitment scheme (as detailed in "Non-interactive and Information-theoretic Secure Verifiable Secret Sharing", T. P. Pedersen, in J. Feigenbaum, editor, Advances in Cryptology—CRYPTO '91, volume 576 of Lecture Notes in Computer Science, pages 129-140, Springer Verlag, 1992) in which the public parameters are a group G of prime order q, and generators $(g_0, \ldots, g_m)$. In order to commit to the values $(v_0, \ldots, v_m) \in Z_q^m$, pick a random $r \in Z_q$ and set $$C = Com(v_0, \ldots, v_m; r) = g_0^r \prod_{i=1}^{m} g_i^{v_i}.$$

Damgård and Fujisaki ("An integer commitment scheme based on groups with hidden order", I. Damgård and E. Fujisaki, http://eprint.iacr.org/2001, 2001) show that if the group G is an RSA group and the committer is not privy to the factorization of the modulus, then in fact the Pedersen commitment scheme can be used to commit to integers of arbitrary size.

We specify an abstract interface for integer commitments: $Com(v_1, \ldots, v_m; r))$ for values $v_i$ and a random number r produces an integer commitment C on the values $v_i$.

Known Discrete-Logarithm-Based, Zero-Knowledge Proofs

In the common parameters model we use several known results for proving statements about discrete logarithms. When referring to such proofs, we will follow the notation introduced by Camenisch and Stadler (J. Camenisch and M. Stadler. "Efficient Group Signature Schemes for Large Groups", J. Camenisch and M. Stadler, in B. Kaliski, editor, Advances in Cryptology—CRYPTO '97, volume 1296 of Lecture Notes in Computer Science, pages 410-424, Springer Verlag, 1997) for various proofs of knowledge of discrete logarithms and proofs of the validity of statements about discrete logarithms. For instance, $$PK\{(\alpha, \beta, \delta): y=g^\alpha h^\beta \wedge \tilde{y}=\tilde{g}^\alpha \tilde{h}^\beta \wedge (u \leq \alpha, \leq v)\}$$

denotes a "zero-knowledge Proof of Knowledge of integers $\alpha, \beta$, and $\delta$ such that $y=g^\alpha h^\beta$ and $\tilde{y}=\tilde{g}^\alpha \tilde{h}^\beta$ holds, where $u \leq \alpha \leq v$ and where $y, g, h, \tilde{y}, \tilde{g}, \tilde{h}$ are elements of some groups $G=\langle g \rangle = \langle h \rangle$ and $G=\langle \tilde{g} \rangle = \langle \tilde{h} \rangle$. The convention is that Greek letters denote quantities of which knowledge is being proved, while all other values are known to the verifier. We apply the Fiat-Shamir heuristic ("How to prove yourself: Practical solutions to identification and signature problems", A. Fiat and A. Shamir, in A. M. Odlyzko, editor, Advances in Cryptology—CRYPTO '86, volume 263 of Lecture Notes in Computer Science, pages 186-194. Springer Verlag, 1987) to turn such proofs of knowledge into signatures on some message m; denoted as, for example, $SPK\{(\alpha): y=g^\alpha\}(m)$. Given a protocol in this notation in the following description, the derivation of an actual protocol implementing the proof will be apparent to those skilled in the art.

Camenisch-Lysyanskaya Signatures

The exemplary embodiments to be described leverage Camenisch-Lysyanskaya (CL) signatures as high-level building blocks. CL signatures are described in detail in: "A Signature Scheme with Efficient Protocols", J. Camenisch and A. Lysyanskaya, in S. Cimato, C. Galdi and G. Persiano editors, Security in Communications Networks, Third International Conference, SCN 2002, volume 2576 of Lecture Notes in Computer Science, pages 268-289, Springer Verlag, 2003. Briefly, however, the scheme consists of two secure protocols:

(1) An efficient protocol between a user and a signer with keys $(pk_{IDP}, sk_{IDP})$. (IDP here refers to an Identity Provider who issues identity credentials to a user. This entity might be a passport authority or similar, and implementations are well known in the art and need not be discussed further here). The common input consists of $pk_{IDP}$ and C, a Damgård and Fujisaki commitment as introduced above. The user's secret input is the set of values $(v_1, \ldots, v_l; r)$ such that $C=Com(v_1, \ldots, v_l; r) \pmod{n}$. As a result of the protocol, the user obtains a signature $\sigma_{pk_{IDP}}(v_1, \ldots, v_l)$ on his committed values, while the signer does not learn anything about them.

(2) An efficient proof of knowledge of a signature protocol between a user and a verifier. The common inputs are $pk_{IDP}$ and a commitment C. The user's private inputs are the values $(v_1, \ldots, v_l, r)$, and $\sigma_{pk_{IDP}}(v_1, \ldots, v_l)$ such that $C=Com(v_1, \ldots, v_l; r)$. These signatures are secure under the strong RSA assumption discussed above.

The CL scheme uses the integer commitment primitive Com( )introduced above which can be operated on by zero-knowledge proofs of knowledge. We provide an additional interface to the scheme:

CLSetup($1^k$) outputs parameters parCL.

CLKeyGen(parCL) outputs a public key/private key keypair ($pk_{IDP}$, $sk_{IDP}$).

CLSign(U($pk_{IDP}$, C, ($v_1, \ldots, v_l$, r)), IDP($pk_{IDP}$, $sk_{IDP}$;C)) outputs a CL signature on the user's values ($v_1, \ldots, v_l$) to the user U and nothing to the IDP, iff C=Com($v_1, \ldots, v_l$, r).

CLVerify(U($pk_{IDP}$, C, ($v_1, \ldots, v_l$, r), $\sigma_{pk_{IDP}}(v_1, \ldots, v_l)$), V($pk_{IDP}$, C)) outputs valid to the verifier V and nothing to the user U iff C=Com($v_1, \ldots, v_l$, r). Otherwise, it outputs ⊥ to both principals.

Committed Blind Anonymous IBE

An Identity-based Encryption (IBE) scheme is an encryption scheme that allows the public key of a recipient to be an identity string id. Examples could be the recipient's e-mail address, yet, also the identifier of a service transaction. IBE schemes rely on a trusted third party, the Key Generation Center (KGC), to derive the user's secret key for an identity $sk_{id}$. The function to generate this secret key from the identity string is called IBEExtract( ).

We leverage an IBE scheme with two additional properties: anonymity and blind extraction. Anonymous IBE (introduced by Abdalla et al., "Searchable encryption revisited: Consistency properties, relation to anonymous ibe, and extensions", in V. Shoup, editor, Advances in Cryptology—CRYPTO 2005, volume 3621 of Lecture Notes in Computer Science, pages 205-222, Springer Verlag, 2005) ensures that it is infeasible to derive the identity string id to which the message was encrypted from the ciphertext.

Green and Hohenberger ("Blind identity-based encryption and simulatable oblivious transfer", in ASIACRYPT, pages 265-282, 2007) introduced blind extract IBE, which provides the capability to generate the secret key to an identity $sk_{id}$ in a blinded fashion. Where normal IBE schemes transfer the identity string in plain text to the Key Generation Center, Blind Extract IBE keeps the identity id confidential from it.

Camenisch et al propose an IBE primitive that combines both properties in "Public key encryption with oblivious keyword search and its application to data retention", IBM Research Report RZ 3708, IBM Research, May 2008, http://domino.research.ibm.com/library/cyberdig.nsf/index.html. Their Committed Blind Anonymous IBE allows for a blind extraction of the secret key $sk_{id}$ by giving the Key Generation Center a commitment on the identity string. The user of the system may either disclose partial information about the identity string or prove statements with efficient Zero-Knowledge Proofs of Knowledge about the commitment. This may, for instance, convey statements about linear relations or range proofs. Clearly, such proofs can be easily combined with proofs over attributes certified by a CL signature as introduced above.

We refer to the system interface of Camenisch et al in the IBM Research Report RZ 3708 reference above:

IBESetup($1^k$) outputs parameters par/BE and master secret msk.

IBEBlindExtract(A(parIBE, id, open), KGC(msk, C)) generates the secret decryption key $sk_{id}$ for a user A's identity id in an interactive key issuing protocol between A and the KGC. If C=Com(id, open), then the user's output is a decryption key $sk_{id}$ and the output of the KGC is empty. Otherwise both parties output error.

IBEEnc(parIBE, id, m) outputs ciphertext ct encrypting m under id.

IBEDec(parIBE, $sk_{id}$, ct) outputs message m encrypted in ct.

Verifiable Encryption

As discussed earlier, verifiable encryption schemes allow for proving properties about encrypted data. In their current form, they were introduced by Camenisch and Shoup ("Practical verifiable encryption and decryption of discrete logarithms", in D. Boneh, editor, Advances in Cryptology—CRYPTO 2003, volume 2729 of Lecture Notes in Computer Science, pages 126-144, 2003) who provided the first efficient construction without resorting to cut-and-choose proofs. Their contribution focuses on discrete-log problems. It can be combined with Pedersen's as well as Damgård and Fujisaki's commitment schemes and the CL signature scheme introduced above. In brief, suppose a principal T owns a public key/secret key pair ($pk_T$, $sk_T$). Suppose further that A encrypts a message m under the public key $pk_T$, derives a ciphertext ct and sends it to B. A can prove a statement about the encrypted m in an efficient Zero-Knowledge Proof of Knowledge to B, while B cannot decrypt the ciphertext ct on its own. B may however gain confidence by A's proof that the ciphertext ct contains a valuable piece of information that principal T is able to retrieve. For instance, A may encrypt its own true identity $id_A$ under the public key $pk_T$. It may prove in zero-knowledge that the ciphertext contains the very same identity string as certified in a credential A possesses. Then a receiving service B can be confident that it can have T decrypt the true identity of A if a dispute occurs.

We use the following interface for Camenisch and Shoup's construction:

VESetup($1^k$) outputs parameters parVE and a public key/secret key pair ($Pk_T$, $sk_T$).

VEEnc($pk_T$, m) Encrypts the message m to the public key $pk_T$.

VEDec($sk_T$, ct) Decrypts the ciphertext ct with secret key $sk_T$.

The proof statements about properties of encrypted messages are orthogonal to the verifiable encryption primitive. We can use the same efficient Zero-Knowledge Proof of Knowledge mechanisms as for proofs over commitments, CL signatures, or Committed Blind Anonymous IBE identity strings.

Figure 1:
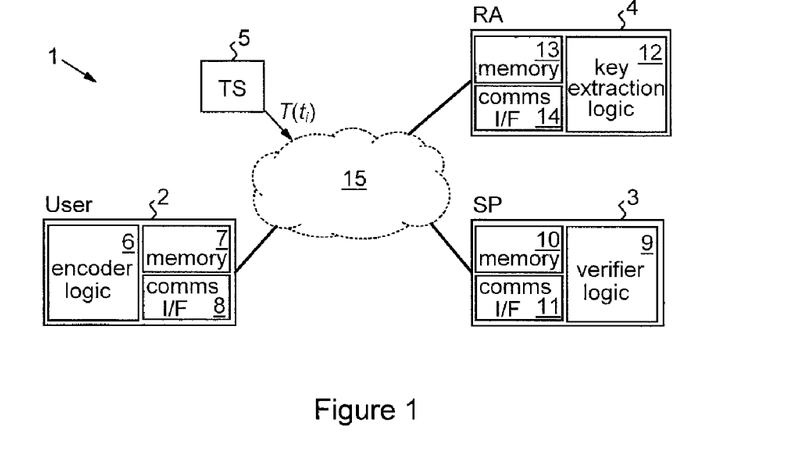
FIG. 1 is a schematic illustration of a first data processing system embodying the invention.

FIG. 1 is a simplified schematic of a first embodiment of a distributed trust data processing system showing the main components involved in operation of the system. The data processing system 1 includes a user computer 2 which embodies an encoding apparatus for encrypting secret user data, and a decoding apparatus implemented by a verifier computer 3 and a key extraction computer 4. The system also includes a time server (TS) computer 5. User computer 2 includes encoder logic 6 for implementing the encoding process, memory 7, and a communications interface 8. Verifier computer 3 includes verifier logic 9 for performing a verification process described below, memory 10, and a communications interface 11. Key extraction computer 4 comprises key extraction logic 14 for implementing functions described below, memory 13, and a communications interface 14. Computers 2, 3 and 4 can communicate over a data communications network 15 via their respective communications interfaces (where network 15 can comprise a plurality of component networks and/or internetworks). The control logic 6, 9, and 12 of these computers is configured for implementing the appropriate steps of cryptographic processes. In general, this control logic can be implemented in hardware or software or a combination thereof, and the precise form of the user, verifier and key-extraction devices 2 to 4 is largely irrelevant to fundamental operation of the cryptographic processes to be described. In this example, however, we assume that these devices are implemented by general-purpose computers, user computer 2 being a user pc and verifier and key extraction computers 3, 4 being servers to which user pc 2 can connect over network 15. Encoder logic 6, verifier logic 9 and key extraction logic 12 are implemented here by respective computer programs which configure the host computers to perform the functions described. Suitable software will be apparent to those skilled in the art from the description herein.

In this illustrative example, the system 1 is employed in an on-line purchasing scenario. Verifier computer 3 is operated by a service provider (SP). A user operating user computer 2 can connect over network 15 to SP computer 3 to buy access to a service. To protect user privacy, the identity of the user should not be revealed to the service provider in this process. However, the service provider requires users to be accountable for their purchases. Hence the service provider should be able to determine the identity of users who do not pay their bills in time.

An overview will now be given of the operation of system 1 for achieving this accountable privacy requirement. The details of exemplary cryptographic processes underlying this operation will be described in connection with a later embodiment.

For operation of system 1, we assume that the user (U) holds cryptographic identity credentials $id_{U,IDP}$ issued by an Identity Provider (IDP) such as a government agency. The implementation of such an IDP is well known in the art and need not be discussed further here. The service provider SP permits anonymous or pseudonymous access to the service, yet wants to ensure that he can hold the user accountable if payment is not made within a defined time period. Hence, for access to the service, the service provider requires the user to provide a cryptographic construction, encoding his identity data, which can be decoded by SP if the user does not pay by the end of the specified time period. However, to protect the user's privacy from an unscrupulous service provider attempting to decode his identity without good cause, a number of measures are employed in system 1.

Firstly, the cryptographic construction encoding the user's identity has a decryption constraint which prevents SP (or anyone else) from decoding the construction before a time corresponding to the end of the allowed payment period. This cryptographic construction is referred to hereinafter as a "time capsule". Time in system 1 is measured by an independent time server TS 5 which issues a succession of time symbols $T(t_i)$ cryptographically encoding the current time $t_i$ at regular intervals. Time server 5 is trusted to release time symbols $T(t_i)$ sequentially and on time, and not to reveal any $T(t_i)$ for a time $t_i$ that has not yet occurred. The implementation of time server 5 is well known in the art and need not be discussed further here.

A second user-protection measure provided in system 1 is that a decryption key for the time capsule can only be generated by key extraction computer 4 which is operated independently of service provider SP by a "revocation authority" (RA). The revocation authority RA manages the key-pairs used to encrypt and decrypt time capsules. The user U can communicate with this authority in order to encrypt a time capsule, and the service provider SP must communicate with RA to obtain the decryption key necessary to "open" a time capsule.

As a third protection measure, the revocation authority RA can revoke decryptability of a time capsule if proof is received that appropriate payment has been made by the user. Hence, RA is trusted to not reveal any time capsule decryption key if it detects that the time capsule's contracted revocation condition (e.g. payment of a bill) has occurred. (Note that it is not necessary to trust that the RA will not reveal a time capsule's key before the contract, specifically the payment term, has expired since this is cryptographically enforced as mentioned above).

Figure 2:
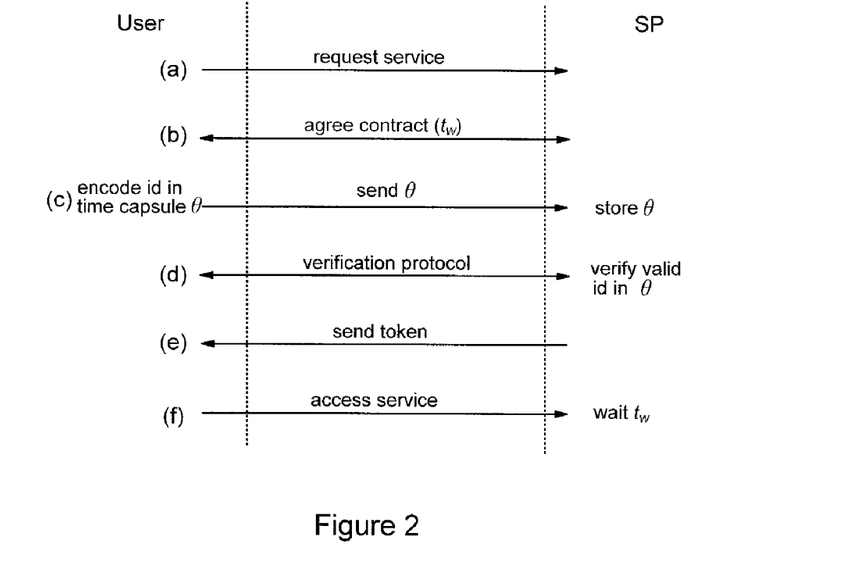
FIG. 2 illustrates interaction between a user computer and a verifier computer in the FIG. 1 system.
Figure 3:
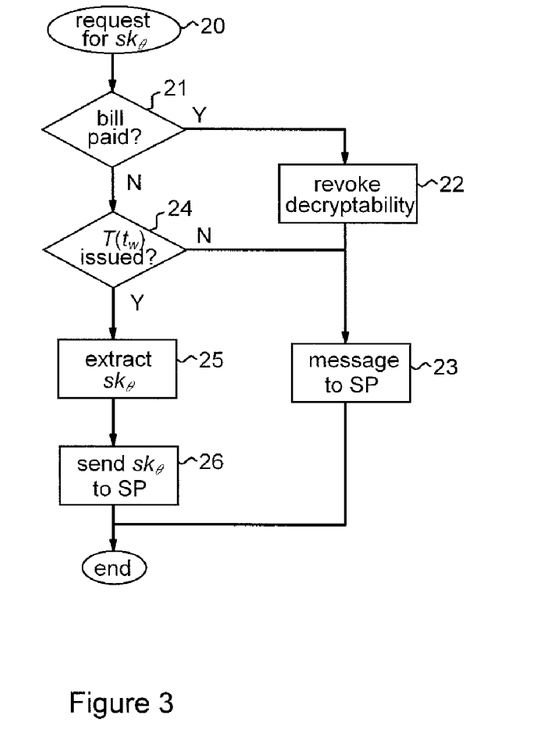
FIG. 3 illustrates operation of a key extraction computer in the FIG. 1 system.

The operation of user computer 2, SP computer 3 and RA computer 4 is illustrated in more detail in FIGS. 2 and 3. FIG. 2 indicates the key steps performed by user computer 2 on the left of the figure and SP computer 3 on the right when a user wishes to access the on-line service. Prior to operation, a set-up procedure is performed in which the encoder logic 6 of user computer 2 communicates with the key extraction logic 12 of RA computer 4 to agree on the definition of various parameters to be used for generating the keypairs for encryption and decryption of time capsules. Parameters to be used by the logic 6, 12 in this process are stored in the respective memories 7 and 13 of these computers. Subsequently, the user can open a communications channel to SP computer 3 to request access to the service as indicated in step (a) of FIG. 2.

In step (b) the user and SP computers 2, 3 implement an enrollment procedure in which the parties agree contract terms for access to the service. As part of this process, the time $t_\omega$ by which the user must make payment for the service is established. In step (c) the encoder logic 6 of user computer 2 then generates a time capsule θ. The time capsule θ is produced by encoding the user's secret identity credential $id_{U,IDP}$ in accordance with a verifiable encryption process such that the resulting cryptographic construction has a decryption constraint dependent on the occurrence of a predetermined time event. In more detail, encoder logic 6 uses parameters pre-agreed in the set-up procedure to generate the public key $pk_\theta$ of a public-private keypair $pk_\theta$, $sk_\theta$ for the time capsule θ.

This keypair $pk_\theta$, $sk_\theta$ is dependent on an event indicator. Here, the event indication is time $t_\omega$ which represents the event on which the time capsule's decryption constraint depends. In particular, extraction of the private key $sk_\theta$ of the keypair is dependent on occurrence of this event, here availability of the time symbol $T(t_\omega)$ for time $t_\omega$. Encoder logic 6 then encodes the secret identity credential $id_{U,IDP}$ using the public key $pk_\theta$ to produce the time capsule θ. (The time capsule can also encode other data, and will typically encode at least a transaction identifier supplied by SP computer 3 for the user transaction, as illustrated in the more detailed example below).

In step (c) of FIG. 2, encoder logic 6 sends the time capsule θ to SP computer 3 where it is received by verifier logic 9 and stored in memory 10. Next, in step (d) the verifier logic 9 communicates with encoder logic 6 to implement a cryptographic verification protocol. This protocol stems from the verifiable encryption process used to generate the time capsule. Specifically, the verifiable encryption process is such that it is possible to implement a cryptographic proof of knowledge demonstrating that the time capsule contains a valid identity credential without revealing the secret identity credential itself. This verifiable encryption process can be a committed blind anonymous identity-based encryption scheme, detailed below, which also allows logic 9 to verify that the time capsule can be opened if necessary. Having performed the verification process, in step (e) the verifier logic 9 then sends the user a token that permits access to the service. Such tokens are well known in the art and need not be described further here. The user can then access the service in step (f), and the verifier logic 9 awaits time $t_\omega$ when a check for payment will be conducted.

Under normal circumstances, the user U will arrange for payment to be made to the service provider SP, and will typically obtain proof of payment, such as an electronic bank receipt, by which the payment can be demonstrated to the revocation authority RA. In simple embodiments, such a receipt can simply be sent by the user to RA computer 4 where it will be received by key extraction logic 12 and stored in memory 13. A more sophisticated system for proving payment to the revocation authority will be described below. In any case, the next stage in operation of system 1 occurs at time $t_\omega$ when verifier logic 9 of SP computer 3 contacts RA computer 4. FIG. 3 indicates the key steps performed by key-extraction logic 12 of RA computer 4 in the ensuing process.

Operation commences at step 20 of FIG. 3 when the key-extraction logic receives a request for the time capsule decryption key $sk_\theta$ from verifier logic 9. This request includes sufficient information to enable the appropriate transaction to be determined. This can comprise the transaction identifier mentioned earlier, though the information supplied here can partially determine the extent to which different user transactions are linkable by revocation computer 4. Hence, in the preferred system detailed below, the request comprises a portion of the time capsule θ containing a blinded form of the transaction identifier. In any case, key extraction logic 12 responds to receipt of the request in step 21 by checking whether the contracted revocation condition, i.e. bill payment, has occurred for the transaction. If so ("yes" (Y) at decision step 21), operation proceeds to step 22 where logic 12 revokes decryptability of the corresponding time capsule θ so that this time capsule can never be decrypted. This can be done, for example, by deletion from memory 13 of data necessary for extracting the decryption key $sk_\theta$. RA computer 4 then notifies the SP computer 3 in step 23 that the user has paid his bill, and the process is complete. At this point, verifier logic 9 can delete the stored time capsule θ from memory 10.

Returning to decision step 21, if key extraction logic 12 decides that the user has not paid his bill ("no" (N) at step 21), then operation continues to step 24. Here logic 12 determines if the time symbol $T(t_\omega)$ has been issued by TS computer 5 for the time $t_\omega$. If not, then the permitted payment term has not yet expired. A message to this effect will then be sent to verifier logic 9 in step 23, and the process terminates. Note that, even if an unscrupulous revocation authority acted in concert with the service provider to attempt extraction of key $sk_\theta$ before time $t_\omega$, key extraction is not be possible due to the inherent decryption constraint on the time capsule. In particular, the time symbol $T(t_\omega)$ can not yet be issued and this time symbol is a required input for the cryptographic key extraction process. Only if $T(t_\omega)$ is available at step 24 will it be determined that the user has breached the payment contract. In this case, key extraction logic 12 proceeds in step 25 with the extraction of decryption key $sk_\theta$. This key is sent to verifier logic 9 in step 26, whereupon the service provider SP can decrypt the time capsule to obtain the identity of the user and take action to obtain payment.

It will be seen that the overall decoding condition for the time capsule is dependent on two events in the above embodiment. The first event is the issue of time symbol $T(t_\omega)$ as determined by the time capsule's inherent decryption constraint, and the second event is bill-payment by the user. The check as to whether the decoding condition has been met ($T(t_\omega)$ available (i.e. time $t>t_\omega$) AND bill unpaid) is embodied in steps 21 and 24 of FIG. 3. User privacy is thus protected by both the time capsule decryption constraint and the provision for RA to revoke decryptability (step 22 of FIG. 3) when a contract has been satisfied. Moreover, no party has full power to decrypt a time capsule as trust is distributed between SP, RA and TS in this system. The RA can extract time capsule decryption keys only when permitted by the time-dependent decryption constraint, but does not hold a copy of the time capsule itself. SP cannot decrypt any time capsule it holds unless a valid decryption key is available from RA. Before the predetermined release time $t_\omega$, no party can decrypt θ. If the user fulfills the revocation condition (bill payment) before time $t_\omega$, neither SP nor any other party will be able to open the time capsule θ. If the user does not fulfill the revocation condition before time $t_\omega$, only SP can open θ. Thus the system 1 provides a highly effective distributed trust accountable privacy system based on time capsules containing user identity data.

The foregoing explains the basic operation of a distributed trust system embodying the invention. Particularly preferred embodiments employ additional measures to protect user privacy by ensuring that different user transactions are unlinkable by parties to the system. An example of such a system, offering full end-to-end unlinkability, will now be described. This description gives details of the underlying cryptographic processes which can be used to implement the functionality described for the foregoing as well as the following embodiment. Modifications to the following processes for implementing the simpler embodiment of FIG. 1 will be apparent to those skilled in the art. In the following system, the unlinkability feature is that, if the revocation condition occurs before time $t_\omega$, then no party will be able to link the user's transactions together, nor link any transaction to a specific user. This is a stronger notion of privacy than currently offered in existing systems.

Figure 4:
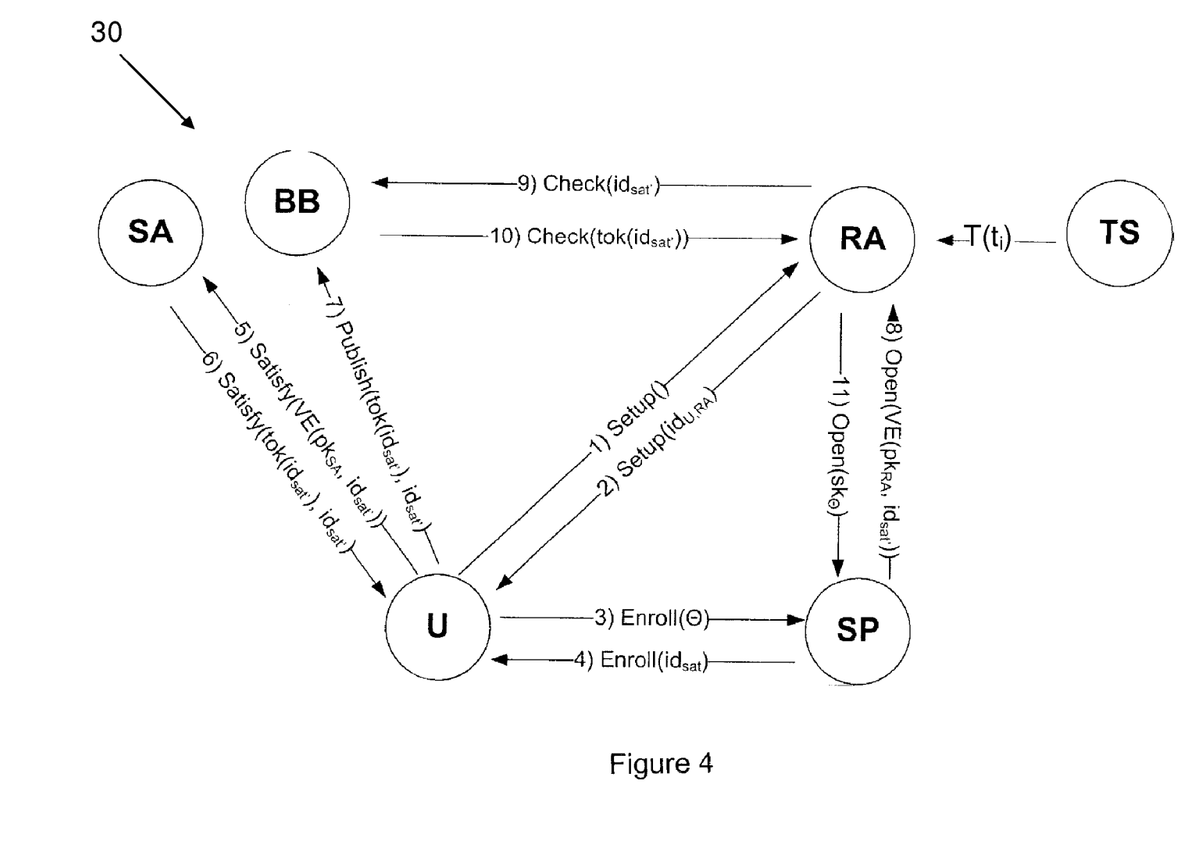
FIG. 4 is a schematic illustration of a second data processing system embodying the invention showing steps involved in operation of the system.

FIG. 4 shows the key components of the preferred system, indicated generally at 30. The numbered arrows in the figure represent the basic processes involved in operation of the system 30 and show the information flow between system components. U, SP and RA correspond to computers 2, 3 and 4 respectively in the FIG. 1 system. These computers operate substantially as described above except where contrary operation is defined in the following. Similarly, TS corresponds to time server computer 5 in FIG. 1. The system 30 additionally includes two further components represented in the figure by respective computers labeled SA and BB. SA represents a computer operated by a "satisfaction authority", such as a bank, who can issue a "satisfaction token" confirming payment by user U to service provider SP. SA is trusted to honestly report when payment has occurred. BB represents a computer running a bulletin board. Bulletin boards are well known in the art and essentially provide a public forum in which items posted are available for anyone to download. In system 30, BB is used to post satisfaction tokens by which the user proves payment for a contract. BB is trusted to report all items posted on the bulletin board (although this can also be checked by the user). The following explains the cryptographic processes involved in each numbered step of FIG. 4 with reference to the cryptographic building blocks introduced earlier.

Prior to the numbered steps in the figure, the following system setup steps are performed. The RA performs IBESetup(1 k) and VESetup(1 k) by acting both as an Identity Based Encryption (IBE) Key Generation Center (KGC) as well as a participant in a verifiable cryptosystem. The RA then publishes the resultant public information (parIBE, parVE, pkSA). Hereafter we will implicitly assume that these public parameters are available to all principals.

Setup—steps 1) and 2):
$(U(id_{U,RA})) \leftarrow \text{Setup}(U, RA)$
$\text{Setup}(U, RA) \rightarrow id_{U,RA}$ RA issues a unique pseudonym $id_{U,RA}$ to user U, which can be used for multiple service contracts within the system. This value is used only in blinded form, thus multiple transactions with this same pseudonym are unlinkable. In particular, the pseudonym $id_{U,RA}$ will form a part of the time capsule's key.

By using committed blind anonymous IBE, the pseudonym will be later used only in blinded form, preventing linkability between transactions.

Enrollment—steps 3) and 4):

$(U(id_{sat}), SP(\theta)) \leftarrow Enroll(U(id_{U,RA}, id_{U,IDP}), SP)$

During enrollment the user makes a contract with the service provider, the user receives a token that permits use of the service, and the SP leaves the user with a mechanism to prove fulfillment of the contract (payment). The user leaves the service provider with a time capsule $\theta$ that can be opened later to identify the user if the contract is not fulfilled. In more detail:

$Enroll(U(id_{U,RA}, id_{U,IDP}), SP)$ i) U and SP jointly compute a random transaction identifier $id_{sat}$ which is then known to both parties, and a blinded form of the same identifier known to neither U nor SP, but rather encrypted to SA and RA respectively: $VEEnc(pk_{SA}, id_{sat}')$, $VEEnc(pk_{RA}, id_{sat}')$. The joint computation of $id_{sat}$ which is then known to both parties can be realized using standard techniques. Joint computation of the blinded $id_{sat}'$ that is known to neither computing party, but is verifiably encrypted to other parties, can be realized using standard homomorphic encryption techniques with the addition of blind anonymous verifiable encryption of the jointly computed value.

ii) U computes the public portion of a keypair $(pk_\theta, sk_\theta)$ which is generated such that the keypair depends on $(id_{U,RA}, t_\omega, id_{sat})$. The creation of a keypair that depends on the values $(id_{U,RA}, t_{107}, id_{sat})$ is possible by using those values, which include the event indicator $t_\omega$, as the identity in the generation of a committed blind anonymous IBE. Using this form of IBE $pk_\theta$ can be released, and an encryption against this key can be verified, without revealing the identity or corresponding $sk_\theta$. Additionally, the later extraction of $sk_\theta$ is a blind anonymous extraction that will not reveal these values.

iii) U computes the time capsule as follows: $\theta = (VEEnc(pk_\theta, id_{U,IDP}), VEEnc(pk_{RA}, id_{sat}'))$ and sends $\theta$ to SP.

iv) SP verifies in zero knowledge that 8 can be decrypted by $sk_\theta$ and that RA can derive $sk_\theta$. The verifiable encryption shown by the Green and Hohenberger reference given earlier permits the properties that we require of the time capsule $\theta$. In particular it is suitable for the encryption key $pk_\theta$ such that the contents of the encryption and the decryptability under the secret values $(id_{U,RA}, t_\omega, id_{sat})$ is possible with further zero knowledge proofs.

v) SP verifies in zero knowledge that $\theta$ contains the user's identity with respect to the system: $id_{U,IDP}$.

vi) SP sends to U a token permitting access to the service.

Satisfaction of Revocation Condition—Steps 5) and 6):

$(U(tok(id_{sat}'), id_{sat}'), SA(id_{sat}')) \leftarrow Satisfy(U(id_{sat}'), SA(sk_{SA}))$ The user invokes this protocol to fulfill the contract (pay the bill). The satisfaction authority SA (typically the bank) provides a secure receipt that the user later publishes to prove payment of the bill. The receipt is blinded such that it can prove payment for the transaction without revealing the identity of the user. In more detail, the protocol is:

$Satisfy(U(VEEnc(pk_{SA}, id_{sat}')), SA(sk_{SA}))$

At the end of this protocol U has proven to SA that the revocation condition has occurred with respect to the blinded encrypted form of the satisfaction token $VEEnc(pk_{SA}, id_{sat}')$. The user receives from SA a revocation token $tok(id_{sat}')$, and the now decrypted satisfaction token $id_{sat}'$, which together prove that the contract with respect to the blinded satisfaction token has been fulfilled. This proof can be accomplished with standard anonymous credential techniques:

i) The satisfaction token minted by SP with respect to $id_{sat}'$ can be accomplished by encoding the satisfaction conditions (such as an amount of money to be paid, and the destination of that money) as attributes in an anonymous credential that has $id_{sat}'$ encoded as a committed attribute.

ii) When SA decrypts its copy of $id_{sat}'$ it can verify that the correct amount of money is being paid to the correct entity, and that the transaction is securely linked to the blinded satisfaction token.

iii) SA can then sign a statement that the transaction $id_{sat}'$ has been fulfilled using any secure signature scheme.

Publish—step 7):

$(\ ) \leftarrow Publish(U(tok(id_{sat}'), id_{sat}'), BB)$

By publishing the receipt of payment the user prevents the service provider from being able to reveal his identity. In particular, to invoke the revocation condition Revoke(U, BB) the user publishes proof of payment to the bulletin board BB $tok(id_{sat}')$ and $id_{sat}'$. By broadcasting proof of payment on BB, the user revokes the ability of SP to open the time capsule. Since only $id_{sat}'$ and a signature on $id_{sat}'$ are broadcast, and since $id_{sat}'$ cannot be linked with the user, this satisfies the privacy requirements of the system.

Check—Steps 9) and 10):

$(RA(tok(id_{sat}'))) \leftarrow Check(RA(id_{sat}'), BB(id_{sat}'))$

The revocation authority RA checks for revocation of 8 by searching the BB for the secure receipt, and verifying that it is a correct payment for the correct bill. If a receipt is found and verified, then the check succeeds indicating that revocation has occurred and the contract is complete. In other words, if check succeeds then $\theta$ should never be opened. The RA checks for revocation by searching the BB for $id_{sat}'$ using protocol $Check(RA(id_{sat}'), BB(id_{sat}'))$ and verifying $tok(id_{sat}')$. If they are found and verified then the check succeeds, indicating that revocation has occurred and the contract is complete. During the Check operation, $id_{sat}'$ is revealed to RA by decryption under $sk_{RA}$. This suffices for RA to determine whether the contract has been satisfied, but RA cannot link the Enroll event for this transaction with this check, which provides the end-to-end unlinkability required for honest users.

Open—Steps 8) and 11):

$(SP(sk_\theta)) \leftarrow Open(SP(\theta), RA(sk_{RA}), TS(t_i))$

In the open transaction the service provider attempts to gain knowledge of the user's real identity. The SP requests this knowledge by providing the revocation authority with a designated portion of the time capsule. If the user has not paid his bill, and the bill is overdue, the revocation authority will be able to extract the secret key that unlocks the rest of the time capsule. If the user has honestly paid the bill, however, this transaction will not succeed, and the service provider learns nothing. In more detail, in the protocol $Open(SP(\theta), RA(sk_{RA}), TS(t_i))$:

i) SP sends $VEEnc(pk_{RA}, id_{sat}')$ to RA and requests $sk_\theta$. In the first step of opening, RA must perform an IBE key extraction of $sk_\theta$ in order to retrieve $id_{sat}'$. Here we use the special anonymity properties of anonymous blind committed IBE to perform the key extraction without RA gaining knowledge of the user's true identity. Note that key extraction will only succeed if the time symbol for time $t_\omega$ is now available from TS. This satisfies the temporal constraint imposed in the system.

ii) RA decrypts $VEEnc(pk_{RA}, id_{sat}')$ to retrieve $id_{sat}'$ (which is not linkable by RA with any other data).

iii) RA performs Check ($id_{sat}'$). If Check succeeds, RA detects revocation and halts without returning $sk_\theta$.

iv) If $t_i < t_\omega$, RA halts without returning $sk_\theta$.

v) RA generates and returns $sk_\theta$.

vi) SP decrypts and reveals $id_{U,IDP}$. Only if: (i) a revocation is not detected by RA; and (ii) a key extraction is possible (e.g., it is after time $t_\omega$) will the $sk_\theta$ be revealed to SP. If the key is revealed to SP then the capsule can be opened and the user's true identity revealed. This satisfies the privacy properties and the accountability properties of the system.

It will be appreciated that many changes and modifications can be made to the exemplary embodiments described above. By way of example, the event on which the decryption constraint depends can be something other than a time event. Further, the decoding condition applied by the revocation authority can be dependent in general on one or more further events, and can be dependent in numerous ways on occurrence of the different events as desired for a given application. As envisaged earlier, components represented by single computers in the embodiments described can be implemented in practice by more than one computer of a distributed computing system. In addition, depending on the particular level of privacy demanded for a given system, any combination of the entities SA, BB, TS, and even SP and RA, can be merged. Intrinsic decryption constraint provides improved accountable privacy compared to prior systems since no single entity has unlimited power to decrypt the secret data.

While the secret data is user identity data in the exemplary scenarios above, embodiments of the invention can of course be applied to any secret data which should only be revealed to a receiving party under certain circumstances. Many other changes and modifications can be made without departing from the scope of the invention.

The invention claimed is:

1. A method comprising:
   receiving a unique pseudonym to be used for a service contract;
   performing enrollment with a service provider to enroll a user in the service contract with the service provider, wherein performing enrollment comprises:
   computing a transaction identifier corresponding to the service contract;
   generating a public key of a public-private key pair which is dependent at least on a specific time such that extraction of a private key of said public-private key pair is dependent on a cryptographic encoding of the specific time, wherein the cryptographic encoding will not be released until the specific time has passed, wherein the public-private key pair is further dependent on the unique pseudonym and the transaction identifier;
   producing a time capsule at least by encoding, using at the public key, at least a secret identity credential of the user using said public key and in accordance with a verifiable encryption process; and
   transmitting said time capsule through a data communications channel to the service provider,
   wherein generating, encoding and transmitting are performed prior to the specific time;
   in response to the user paying a bill that fulfills the service contract, performing a protocol with a first entity to prove payment for the service contract has been fulfilled, receiving proof from the first entity that payment for the service contract has been fulfilled, and publishing an indication of the proof to a second entity.

2. The method according to claim 1, further comprising:
   generating said public key of said key pair in accordance with a committed blind anonymous identity-based encryption scheme having an identity string comprising said time.

3. The method according to claim 1, wherein transmitting further comprises transmitting said time capsule to a receiving device of a data processing system through said data communications channel.

4. A computer readable article of manufacture tangibly embodying computer readable instructions which, when executed, cause a computer device to implement a method according to claim 1.

5. A method, comprising:
   receiving a plurality of time symbols, each time symbol being a cryptographic encoding of a corresponding time. wherein a time symbol corresponding to a specific time is available only after the specific time has occurred;
   receiving one or more components of a time capsule, wherein the time capsule comprises a secret identity credential of a user previously encrypted using a public key of a public-private key pair which is dependent at least on the specific time such that extraction of a private key of said public-private key pair is dependent on a cryptographic encoding of the specific time, and wherein the time capsule is created and the one or more components of the time capsule are received prior to the specific time;
   receiving, from a requestor, a request for a private key corresponding to the time capsule;
   determining if one or more decoding conditions exist;
   responsive to a determination the one or more decoding conditions exist, extracting said private key of said key pair using at least the time symbol corresponding to the specific time and the one or more components of the time capsule, and sending said private key to the requestor, wherein the extracting will only succeed if the time symbol corresponding to the specific time is available.

6. The method according to claim 1, wherein:
   performing enrollment further comprises performing an enrollment procedure with a service provider in which the specific time is established and the specific time is a time by which the user must make payment for a service provided by the service provider; and transmitting further comprises transmitting the time capsule through the data communications channel to the service provider.

7. The method according to claim 6, wherein performing the enrollment procedure further comprises performing the enrollment procedure in which the user and the service provider agree to contract terms for access to the service provided by the service provider.

8. The method according to claim 1, wherein the identity credential comprises a unique pseudonym.

9. The method according to claim 8, wherein:
   the method further comprises:
   performing a setup process with a revocation authority, in which the unique pseudonym is issued.

10. The method according to claim 5, wherein determining if one or more decoding conditions exist further comprises determining whether a user made a payment corresponding to the time capsule, and determining the decoding condition exists in response to a determination the user has not made a payment corresponding to the time capsule.

11. The method according to claim 10, further comprising, in response to a determination the user made a payment corresponding to the time capsule, revoking decryptability of the time capsule at least by deleting from memory of data necessary for extracting the private key.

12. The method according to claim 10, wherein determining if one or more decoding conditions exist further comprises determining whether the time symbol corresponding to the specific time has been received, and determining the decoding condition exists in response to a determination the time symbol corresponding to the specific time has been received.

13. The method according to claim 5, wherein:

the method further comprises performing a setup process with a computer of the user, in which a unique pseudonym is issued to the user; and the public-private key pair is dependent at least on the specific time, the unique pseudonym, and a transaction identifier.

14. The method according to claim 5, wherein:

the requestor comprises a service provider;

the request comprises a blinded form of the transaction identifier; and the method further comprises decrypting, using the private key, the request to extract the blinded form of the transaction identifier, and performing a check of the blinded form of the transaction identifier, and not sending the private key in response to the check of the blinded form of the transaction identifier succeeding.

15. A computer readable article of manufacture tangibly embodying computer readable instructions which, when executed, cause a computer device to implement a method according to claim 5.

16. A method, comprising:

receiving a time capsule, wherein the time capsule comprises a secret identity credential previously encrypted using a public key of a public-private key pair which is dependent at least on a specific time such that extraction of a private key of said public-private key pair is dependent on a cryptographic encoding of the specific time, wherein the time capsule is created and received prior to the specific time, and wherein the cryptographic encoding will not released until the specific time has passed;

sending a request for a private key corresponding to the time capsule;

in response at least to the sending the request performed after expiration of the specific time, performing the following:

receiving the private key; and using the private key to decrypt and reveal the secret identity credential; and in response at least to the sending the request performed prior to expiration of the specific time, performing the following:

receiving a message, wherein the received message does not contain the private key because the specific time has not elapsed and the cryptographic encoding is not available for extraction of the private key.

17. The method according to claim 16, further comprising performing an enrollment procedure with a user in which the specific time is established and the specific time is a time by which the user must make payment for a service provided by a service provider.

18. The method according to claim 17, wherein performing the enrollment procedure further comprises performing the enrollment procedure in which the user and the service provider agree to contract terms for access to the service provided by the service provider.

19. A computer readable article of manufacture tangibly embodying computer readable instructions which. when executed, cause a computer device o implement a method according to claim 16.

\* \* \* \* \*